Jan. 3, 1933.  L. B. FLOYD  1,893,231
OVER RUNNING CLUTCH
Filed Nov. 16, 1931
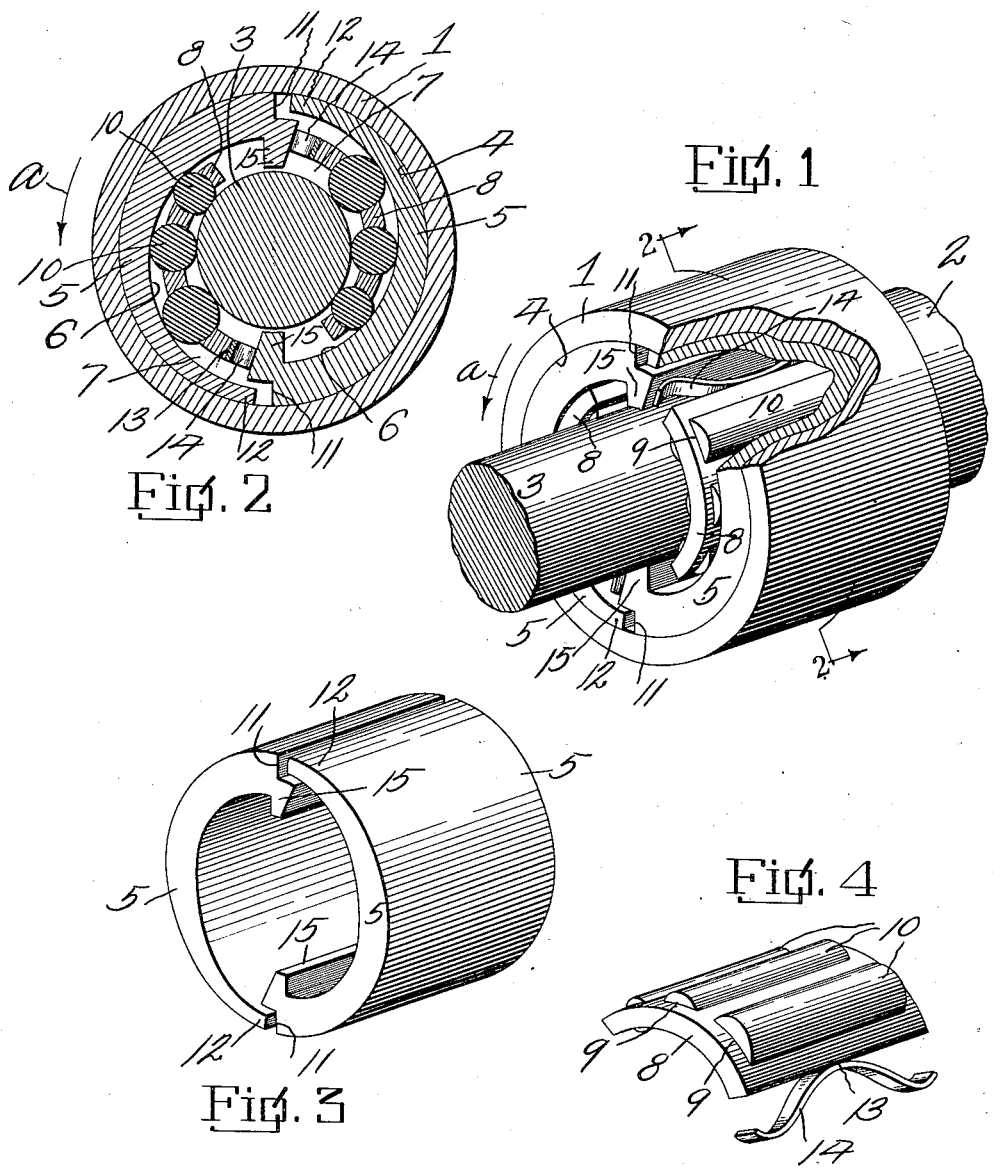
Linzy B. Floyd
INVENTOR Patented Jan. 3, 1933

1,893,231

UNITED STATES PATENT OFFICE

LINZY B. FLOYD, OF PHOENIX, ARIZONA

OVER RUNNING CLUTCH

Application filed November 16, 1931. Serial No. 575,372.

The invention relates to over-running clutches and has for its object to provide a device of this character comprising a rotatable drum having a driven shaft extending axially therein, arcuate shoes concentrically disposed within the drum and cooperating with the inner periphery thereof and with cage carried rollers engaging the inner sides of the shoes and the driven shaft in a manner whereby when the drum is rotated, the driven shaft will rotate with the drum, and when the driven shaft rotates at a speed greater than the drum a declutching operation will take place thereby allowing the over-running operation.

A further object is to provide the arcuate shoes with inner surfaces eccentric in relation to the driven shaft whereby in connection with the shaft tapered chambers are formed and to provide roller cages in said chambers having rollers graduated so as to engage the eccentric surfaces and the shaft whereby a positive clutching operation will take place as the roller cages move into the restricted ends of the chambers.

A further object is to provide the wide end of the tapered shoes with inwardly extending flanges against which springs carried by the roller cages engage for normally forcing the rollers and cages towards the narrow ends of the roller chambers.

A further object is to provide an over-running clutch for general use constructed in a manner whereby a driven shaft may over-run after being rotated.

A further object is to provide means whereby the arcuate shoes may have a limited movement in relation to each other.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the clutch.

Figure 2 is a vertical transverse sectional view through the clutch taken on line 2—2 of Figure 1.

Figure 3 is a perspective view of the clutch shoes, showing them in their relative positions.

Figure 4 is a perspective view of one of the roller cages.

Referring to the drawing the numeral 1 designates a rotatable clutch housing having an extension 2, and extending axially through said housing and into extension 2 is a driven shaft 3. Housing 1 rotates in the direction of the arrow a, Figures 1 and 2 and may be rotated from any suitable source of power, however when the device is declutched the driven shaft is allowed to over-run and rotate independentely of the housing, for instance when the device is used for free wheeling, in connection with a motor driven vehicle.

Housing 1 is provided with a cylindrical chamber 4, in which are disposed arcuately shaped clutch shoes 5. The outer surfaces of the clutch shoes arcuately engage the housing chamber, however they are provided with inner arcuate surfaces 6 eccentric in relation to the chamber and driven shaft 3, thereby forming tapered arcuate chambers 7 around the driven shaft, said chambers being arranged whereby their tapered ends are in opposite positions, the purpose of which will presently appear. Disposed within the chambers 7 are bearing cages 8 having transverse recesses 9 therein, in which are disposed rollers 10, graduated in diameter according to the distance between the outer periphery of the driven shaft 3 and the inner arcuate surfaces 6 of the shoes whereby when the rollers are in clutched relation to the shoes, all of said rollers will engage the driven shaft and the shoes at the same time for insuring a positive clutching operation.

The recesses 9 may be formed with a width equal to the diameter of the rollers and then the cages may be swaged at opposite sides of the rollers for maintaining the rollers in the cages.

The wide ends of the arcuate shoes 5 are provided with transverse recesses 11 into which the narrow ends 12 of the adjacent shoes extend; in this way there is a slight movement of the shoes in relation to each other for allowing a declutching of both shoes from the inside periphery of the housing. Welded or otherwise secured at 13 to ends of the cages 8 are leaf springs 14 having spaced engagement with inwardly extending flanges 15, the springs 14 being provided to normally force the cages 8 and the rollers carried thereby towards the narrow ends of the tapered chambers 7 for maintaining the rollers in peripheral engagement with the driven shaft 3, and the inner eccentric surfaces of the arcuate shoes.

The operation is as follows: Assuming that the housing 1 is rotated in the direction of the arrow a, Figure 2, the shoes are in frictional engagement with the housing and move therewith, however it will be noted that the tapered chambers 7 are in reversed relation and the chamber 7 at the left of Figure 2 has its tapered end upwardly disposed as the shoe 5 at the left rotates downwardly the rollers in the tapered chamber at the left will be forced into jamming engagement with the driven shaft by the spring action of the spring 14, thereby forming a clutching of the driven shaft 3 for rotation with the housing 1. As the rollers at the opposite side of the clutch are in a chamber 7 in reverse relation to the other chamber there will also be a clutching action at this side. If there is an over-running of the shaft 3, the clutching action of Figure 2 will be relieved, thereby allowing the shaft 3 to rotate at a higher speed than the driven housing 1, which is particularly advantageous where the device is used for free-wheeling in connection with a motor driven vehicle.

The invention having been set forth what is claimed as new and useful is:—

1. An over-running clutch comprising a drive member having a cylindrical chamber therein, a driven member extending axially through said chamber, arcuate concentrically arranged clutch shoes in said chamber in frictional engagement with the drive member, said arcuate shoes being shaped whereby in combination with the driven member tapered arcuate chambers are formed around the driven member and through which the driven member directly extends, said arcuate chambers having their wide and narrow ends adjacent each other, bearing cages in said tapered chambers, a plurality of bearing members carried by said cages and engaging the shoes and driven member at spaced points and springs carried by one of the ends of the cages and cooperating with said cages and forcing the same towards the narrow ends of the tapered chambers.

2. An over running clutch comprising a drive member having a cylindrical chamber therein, a driven member extending axially through said chamber, arcuate concentrically arranged clutch shoes in said chamber in frictional engagement with the drive member, said arcuate shoes tapering in thickness thereby forming wide and narrow ends, the wide ends of the shoes being disposed adjacent the narrow ends of the shoes and extending inwardly beyond the inner sides of the narrow ends of the shoes, bearing cages within the chambers, bearings carried by said cages and engaging the shoes and the driven member and springs carried by ends of the bearing cages and engaging the large ends of the shoes and forming means whereby the bearing cages and their bearings are forced concentrically away from the wide ends of the shoes.

3. An over-running clutch comprising a drive member having a cylindrical chamber therein, a driven member extending axially through said chamber, arcuate tapered clutch shoes in said chamber in frictional engagement with the drive member, said shoes forming concentric tapered bearing cage chambers around the driven member with their wide and narrow ends terminating adjacent each other, said tapered shoes having wide and narrow ends terminating adjacent each other, bearing cages within the chambers, springs carried by the ends of the cages adjacent the wide ends of the shoes, said springs normally forcing the cages towards the narrow ends of the bearing cage chambers and bearings carried by said bearing cages and engaging the driven member and the shoes.

In testimony whereof he hereunto affixes his signature.

LINZY B. FLOYD.